United States Patent [19]

Okamura et al.

[11] Patent Number: 5,368,928

[45] Date of Patent: Nov. 29, 1994

[54] WATER-BASED LIQUID FOR TREATING GLASS FIBER CORD FOR REINFORCEMENT OF RUBBER, GLASS FIBER CORD FOR REINFORCING RUBBER, AND REINFORCED RUBBER PRODUCT

[75] Inventors: Akinobu Okamura; Masato Sekiguchi, both of Tsu, Japan

[73] Assignee: Nippon Glass Fiber Co., Ltd., Mie, Japan

[21] Appl. No.: 75,672

[22] Filed: Jun. 11, 1993

[30] Foreign Application Priority Data

Jun. 11, 1992 [JP] Japan .................... 4-151774

[51] Int. Cl.$^5$ .................... C03C 25/02; C08J 5/08
[52] U.S. Cl. .................... 428/294; 428/295; 428/373; 428/374; 428/375; 524/500; 524/510; 524/426; 57/258
[58] Field of Search ............... 428/294, 295, 373, 374, 428/375; 524/500, 510, 426; 57/258

[56] References Cited

U.S. PATENT DOCUMENTS 5,154,975 10/1992 Sekiguchi ..................... 428/338

FOREIGN PATENT DOCUMENTS

| | | | |
|---|---|---|---|
| 86309719.2 | 8/1986 | European Pat. Off. | C08L 71/04 |
| 86103355.3 | 9/1986 | European Pat. Off. | C08J 5/06 |
| 87903410.6 | 5/1987 | European Pat. Off. | C08L 53/02 |
| 87309640.8 | 6/1988 | European Pat. Off. | C08L 71/04 |
| 88114452.1 | 3/1989 | European Pat. Off. | C03C 25/02 |
| 89302031.3 | 10/1989 | European Pat. Off. | C08L 77/00 |
| 89112194.9 | 2/1990 | European Pat. Off. | C08J 5/06 |
| WO87/05322 | 9/1987 | WIPO | C08L 71/04 |

OTHER PUBLICATIONS

Derwent Abstract, Japanese Pat. Pub. 04-126877.
Derwent Abstract, Japanese Pat. Pubs. 63-126975, 02-4715 and 03 ∝ 170534.
Derwent Abstract, Japanese Pat. Pub. 02-208247.
Derwent Abstract, Japanese Pat. Pub. 04-050144.
Derwent Abstract, Japanese Pat. Pub. 02-167845.
Chemical Abstracts, vol. 114, No. 14, p. 93, Abstract No. 124350f.
Chemical Abstracts, vol. 115, No. 16, p. 363, Abstract No. 164872e
Chemical Abstracts, vol. 114, No. 24, p. 93, Abstract No. 230639s.
Chemical Abstracts, vol. 114, No. 8, p. 96, Abstract No. 64055b.
Chemical Abstracts, vol. 114, No. 18, p. 95, Abstract No. 16611h.
Chemical Abstracts, vol. 117, No. 4, p. 107, Abstract No. 28591b.
Chemical Abstracts, vol. 116, No. 16, p. 88, Abstract No. 153627y.
Chemical Abstracts, vol. 116, No. 16, p. 90, Abstract No. 153651b.

*Primary Examiner*—Patrick J. Ryan
*Assistant Examiner*—Richard C. Weisberger
*Attorney, Agent, or Firm*—R. Lawrence Sahr

[57] ABSTRACT

A water-based treating liquid for a rubber-reinforcing glass fiber cord, which contains as a solid component a composition consisting essentially of;
(1) a rubber latex
(2) an alkylated chlorosulfonated polyethylene latex, and
(3) a water-soluble resorcinol-formaldehyde condensate,
wherein, based on the total amount of the components (1) and (2), the amount of the component (2) is 10 to 70% by weight and the amount of the component (3) is 5 to 20% by weight;
a glass fiber cord for reinforcement of a rubber, which contains the above composition as a coating component; and
a rubber product reinforced with the above glass fiber cord, the rubber product being excellent in fatigue resistance under heat and a flexing force.

18 Claims, 1 Drawing Sheet

WATER-BASED LIQUID FOR TREATING GLASS FIBER CORD FOR REINFORCEMENT OF RUBBER, GLASS FIBER CORD FOR REINFORCING RUBBER, AND REINFORCED RUBBER PRODUCT

DETAILED DESCRIPTION OF THE INVENTION

1. Field of the Invention

The present invention relates to a water-based treating liquid for a glass fiber cord used as a reinforcement for rubber products such as a rubber belt, tire and hose, a glass fiber cord for reinforcing a rubber, and a rubber product reinforced with the cord. More specifically, it relates to a reinforced rubber product excellent in fatigue resistance under heat and a flexing force and cold resistance, a water-based treating liquid for a glass fiber cord for the reinforcement of a rubber, and a rubber-reinforcing glass fiber cord.

2. Prior Art

A glass fiber has high tensile strength and high modulus, and exhibits elastic deformation against repeated elongations. Further, it has smaller temperature dependency than any other general rubber-reinforcing organic fiber due to its high modulus, and it also has excellent dimensional stability against water and heat. A glass fiber thus has excellent properties, which properties are particularly preferred as a reinforcing material for rubber products such as a tire, a belt and a hose.

However, one of the serious defects of such a glass fiber is that it has low strength against mutual friction among filaments and that it is poor in fatigue resistance under a flexing force. The fatigue resistance is one of the important properties required of rubber-reinforcing materials. Another defect is that a glass fiber per se has inferior adhesion to a rubber.

Therefore, an adhesive for treating a glass fiber is required not only to impart the glass fiber with the properties of adhering to a rubber but also to improve the fatigue resistance of the glass fiber under a flexing force. In this respect, the adhesive for treating a glass fiber is basically different from an adhesive for treating a rubber-reinforcing material formed of an organic fiber such as a rayon, nylon or polyester fiber.

That is, when the rubber-reinforcing material formed of an organic fiber is treated with an adhesive, a sufficient adhesion effect can be obtained by impregnating the reinforcing material with an adhesive (which is generally a resorcinol-formaldehyde resin latex) until a few layers deep from the surface of the cord of the reinforcing material are impregnated. It is thus not necessary to completely impregnate the cord up to its core, or the infiltration of the adhesive into the deepest layer rather affects the fatigue resistance under a flexing force. It is therefore sufficient to impregnate the cord with the adhesive in an amount of 10% by weight or less based on the cord.

In contrast, when a glass fiber is treated with an adhesive, it is necessary to prevent the mutual friction and abrasion among filaments of the glass fiber by impregnating the cord of the glass fiber with an adhesive (which is generally a resorcinol-formaldehyde resin latex) until the adhesive infiltrates the interface between filaments forming the innermost layer such that all the filaments of the cord are completely coated with the adhesive. Therefore, the amount of the adhesive based on the cord is required to be as large as 15 to 25% by weight, or much greater than the amount of the adhesive required for an organic fiber. However, the use of a large amount of an adhesive to completely coat all the filaments involves the following problems. That is, when a product reinforced with the cord is placed in a high-temperature environment, the aging of the adhesive rapidly proceeds, and the flexibility of the adhesive consequently decreases. As a result, the adhesive layer may break when the product is bent. For this reason, the function of bonding a glass fiber to a rubber and the function of preventing mutual friction and abrasion among the glass fiber filaments, which are essential functions of the adhesive, decrease.

On the other hand, when a product reinforced with the above cord is placed in a low-temperature environment, the adhesive becomes fragile, and the adhesive layer and the glass fiber filaments may therefore break under the energy of an impact. Therefore, when the above cord is used as a reinforcing material for a rubber product such as a tire, a belt or a hose, the product life decreases.

A timing belt reinforced with a glass fiber cord treated with a resorcinol-formaldehyde resin latex recently encountered the following problems. That is, the life of the timing belt decreases, since the aging of the resorcinol-formaldehyde resin latex rapidly proceeds due to an increase in temperature with an increase in the density in an automobile engine room. Further, in an extremely cold area, the resorcinol-formaldehyde resin latex becomes fragile due to extremely low temperatures, and therefore, the resorcinol-formaldehyde resin latex and the glass fiber filaments may break under the energy of an impact, for example, when the engine is started. This is one of the reasons why the life of the belt decreases.

For overcoming the above problems, the present inventors have proposed a novel liquid composition for glass fiber impregnation and a glass fiber cord treated with this liquid composition (U.S. Pat. No. 5,154,975). This liquid composition gives an almost satisfactory improvement in the fatigue resistance under heat and a flexing force, whereas the cold resistance performance still remains to solve.

BRIEF EXPLANATION OF DRAWING

FIGURE schematically shows a heat running tester.

PROBLEMS THAT THE INVENTION INTENDS TO SOLVE

Figure 1:
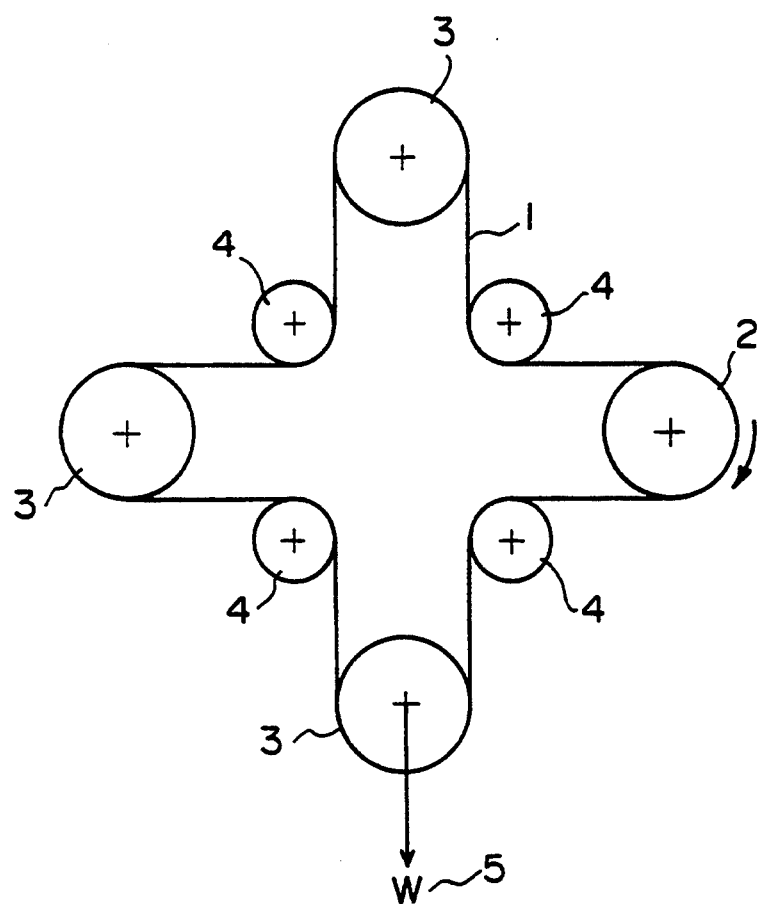

It is a first object of the present invention to provide a reinforced rubber product which retains the advantages of the above prior art and has been improved in the defective performance of the above prior art, i.e., a reinforced rubber product which is excellent in fatigue resistance under heat and a flexing force and cold resistance.

It is a second object of the present invention to provide a rubber-reinforcing glass fiber cord to be used for the above rubber product having excellent properties.

It is a third object of the present invention to provide a water-based treating liquid for the above rubber-reinforcing glass fiber cord.

It is further another object of the present invention to provide a series of techniques for broadening the environmental conditions under which a variety of rubber products reinforced with a glass fiber cord such as a rubber belt, a rubber tire cord and a rubber hose can be used.

Means for Solving the Problems

The above objects and advantages of the present invention are achieved, first, by a water-based treating liquid for a rubber-reinforcing glass fiber cord, which contains as a solid component a composition consisting essentially of;

(1) a rubber latex [component (1)]
(2) an alkylated chlorosulfonated polyethylene latex [component (2)], and
(3) a water-soluble resorcinol-formaldehyde condensate [component (3)], the amount of the component (2) being 10 to 70% by weight and the amount of the component (3) is 5 to 20% by weight, based on the total amount of the components (1) and (2).

Further, according to studies of the present inventors, it has been found that the above other objects of the present invention are achieved by a rubber-reinforcing glass fiber cord containing as a coating component a composition which satisfies the above requirements, and a rubber product reinforced with the above glass fiber cord.

The rubber latex used as component (1) in the present invention is selected from those which are generally used as a treating agent for rubber-reinforcing fibers. Examples of the rubber latex include vinylpyridine-styrene-butadiene terpolymer latex (to be referred to as "VP latex" hereinafter), styrene-butadiene copolymer latex (to be referred to as "SBR latex" hereinafter), acrylonitrile-butadiene copolymer latex, chloroprene latex and butadiene rubber latex. These latexes may be used alone or in combination. Particularly preferred are VP latex and SBR latex. The VP latex is preferably a copolymer obtained by copolymerizing vinylpyridine, styrene and butadiene in a vinylpyridine:styrene:butadiene weight ratio of 10–20:10–20:60–80. This VP latex is preferably selected from commercial products such as Nipol 2518FS (trade name, supplied by Nippon Zeon Co., Ltd.), JSR 0650 (trade name, supplied by Japan Synthetic Rubber Co., Ltd.) and Pyratex (trade name, supplied by Sumitomo-Dow Co., Ltd). The SBR latex is preferably a copolymer obtained by copolymerizing styrene and butadiene in a styrene:butadiene weight ratio of 10–40:60–90. This SBR latex is preferably selected from commercial products such as JSR 2108 (trade name, supplied by Japan Synthetic Rubber Co., Ltd.), Nipol LX112 (trade name, supplied by Nippon Zeon Co., Ltd.) and Baystal S60 (trade name supplied by Bayer AG).

The alkylated chlorosulfonated polyethylene (to be sometimes referred to as "ACSM" hereinafter) latex used as component (2) in the present invention has a structure in which a known chlorosulfonated polyethylene has alkyl branches in places in its ethylene main chain. Each of these alkyl branches is independently an alkyl group having 1 to 10 carbon atoms, preferably an alkyl group having 1 to 6 carbon atoms. Specific examples of ACSM include methylchlorosulfonated polyethylene, ethylchlorosulfonated polyethylene and butylchlorosulfonated polyethylene. The ACSM latex can be prepared from a corresponding ACSM rubber solution by a phase inversion method. That is, it can be obtained by mixing a solvent solution of an ASCM rubber and an aqueous solution of an emulsifier, vigorously stirring the mixture with a stirrer to form an emulsion/dispersion of fine particles of the rubber in water, and removing the solvent. The solvent is selected from aromatic hydrocarbons such as toluene and xylene, halogenated hydrocarbons such as dichloroethane and chloroform, ketones such as methyl ethyl ketone and acetone, and ethers such as tetrahydrofuran. These solvents may be used alone or in combination.

The above emulsifier is selected from generally known emulsifiers such as potassium salts or sodium salts of fatty acids such as oleic acid and stearic acid, rhodinic acid, alkylbenzenesulfonic acid and alkyl sulfonate, and a polyoxyethylene type nonionic emulsifier. These emulsifiers may be used alone or in combination. The stirrer used for preparation of the above emulsion is selected from various homomixers and ultrasonic emulsifying machine. The solvent is removed from the emulsion by a known method such as a steam stripping method.

The ACSM rubber as a raw material for producing the ACSM latex has a structure in which a chlorosulfonyl group ($-SO_2Cl$), a chlorine atom ($-Cl$) and an alkyl group are partially substituted for hydrogen atoms on the polyethylene main chain.

The partial characteristic of the structure of the above ACSM rubber is schematically shown below, in which structure R is the above alkyl group with which the polyethylene main chain is alkylated.

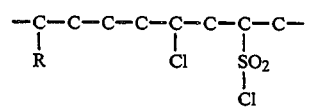

Due to the introduction of the $-C(R)-C-$ unit, the ACSM latex used in the present invention is improved in breaking resistance at low temperature and heat resistance as compared with a chlorosulfonated polyethylene rubber having the following structure.

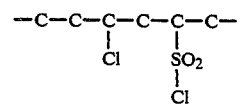

As the ACSM rubber, suitable is an ACSM rubber whose chlorine content is 20 to 40% by weight, preferably 25 to 35% by weight, whose sulfur content in the sulfone group is 0.5 to 2.0% by weight, preferably 0.8 to 1.2% by weight and whose Mooney viscosity is 30 to 60. Further, the alkyl (R) content in the ACSM rubber is 5 to 30% by weight, preferably 10 to 20% by weight. The above ACSM rubber is preferably selected from commercially available products such as Acsium HPR-6367 and Acsium HPR-6932 (both trade names, supplied by du Pont de Nemour & Co.).

The water-soluble resorcinol-formaldehyde condensate (to be referred to as "RF" hereinafter) used as component (3) in the present invention is a resin obtained by reacting resorcinol and formaldehyde in the presence of an alkaline catalyst such as alkali hydroxide, ammonia or amine. It is preferred to use a water-soluble initial addition-condensation product (resol) from resorcinol and formaldehyde, which is rich with oxymethyl groups. Particularly preferred is a condensate obtained by reacting resorcinol and formaldehyde in a resorcinol:formaldehyde molar ratio of 1:0.5–2.5.

In the treating liquid of the present invention, the amount of ACSM latex [component (2)] based on the total amount of tile rubber latex [component (1)] and ACSM latex [component (2)] is 10 to 70% by weight, preferably 20 to 50% by weight. The amount of RF [component (3)] based on the above total amount of the components (1) and (2) is 5 to 20% by weight, preferably 7 to 15% by weight. These components (1) to (3) are homogeneously mixed by a conventional method. The above-specified amounts all refer to as solid contents.

When the amount of ACSM latex [component (2)] exceeds the above upper limit, a reinforcing glass fiber treated with the treating liquid of the invention shows poor flexibility and is liable to show fatigue under a flexing force. When the amount of ACSM latex is smaller than the above lower limit, the fatigue resistance under heat and a flexing force and the cold resistance decrease. When the amount of RF [component (3)] is larger than the above upper limit, a reinforcing glass fiber treated with the treating liquid of the invention becomes hard and the fatigue under a flexing force is liable to occur. When the amount of RF is smaller than the above lower limit, the adhesion to the rubber matrix is liable to decrease. The treating liquid of the present invention contains the rubber latex, ACSM latex and RF as essential components, while it may further contain a latex stabilizer and an aging preventer as required.

It is preferred that the treating liquid of the present invention can be generally used as a water-based treating liquid having a solid content of 15 to 30% by weight.

The treating liquid of the present invention is impregnated into glass fiber strands by immersing the glass fiber strands in the treating liquid, removing an excess of the treating liquid and drying while heating the strands. These glass fiber strands may be those treated with greige goods in spinning a glass fiber. Then, a desired number of the glass fiber strands are collected and, in general, twisted to obtain a glass fiber cord. The glass cord is embedded in a non-vulcanized rubber matrix by a known method, and heat-vulcanized under pressure.

In the above method, the amount of the treating liquid of the present invention is generally 10 to 30% by weight as a solid content based on the glass fiber cord.

The glass fiber cord impregnated with the treating liquid of the present invention exhibits excellent adhesion to various rubbers, particularly to chloroprene rubber, hydrogenated nitrile rubber and chlorosulfonated polyethylene rubber.

With an increase in temperature in an automobile engine room, a chloroprene rubber conventionally used as a rubber for an automobile timing belt is beginning to be replaced with a heat-resistant rubber such as a chlorosulfonated polyethylene rubber or hydrogenated nitrile rubber. The treating liquid of the present invention characteristically shows sufficient adhesion to such heat-resistant rubbers. For further improving the adhesion properties, the glass fiber cord treated with the treating liquid of the present invention may be further treated with an adhesive treating liquid containing a halogen-containing polymer and an isocyanate compound before embedded in a heat-resistant rubber such as a chlorosulfonated polyethylene rubber or hydrogenated nitrile rubber. As the adhesive treating liquid, Chemlok (trade name, supplied by Road Corporation) is properly used.

The above glass fiber cord of the present invention is used as a reinforcing material for a rubber. In this case, a rubber product is obtained by embedding the glass fiber cord in a non-vulcanized rubber matrix by a generally known method as described before, heat-vulcanizing the rubber under pressure and molding it in a desired form. The above rubber can be selected from a variety of rubbers. Particularly preferred are chloroprene rubber, hydrogenated nitrile rubber, chlorosulfonated polyethylene and alkylated chlorosulfonated polyethylene. When these rubbers having the glass fiber cord of the present invention embedded are vulcanized, an additive may be added as required. Such additive is selected from a vulcanization promoter, a pigment, an oil and fat, and a stabilizer. Although differing depending upon the kind of the rubber product, the content of the glass fiber cord in the vulcanized and molded rubber product is generally 10 to 70% by weight, preferably 20 to 40% by weight.

Effect of the Invention

The rubber product reinforced with the glass fiber cord of the present invention is excellent in heat resistance, cold resistance and flexing resistance. The treating liquid of the present invention is remarkably valuable as a treating liquid for a glass fiber cord to be used as a reinforcing material for a product which suffers an external force in a low-temperature or high-temperature environment such as a timing belt.

The present invention will be explained more in detail hereinafter by reference to Examples.

EXAMPLE 1

100 Grams of alkylated chlorosulfonated polyethylene (Ascium HPR-6392, supplied by du Pont de Nemour & Co.) was dissolved in a mixed solvent containing 450 g of methyl ethyl ketone and 450 g of cyclohexane. Then, added to the resultant solution were 3 g of potassium oleate, 1 g of polyoxyethylene nonylphenyl ether and 0.1 g of potassium hydroxide, and the mixture was stirred. 1,000 Grams of water was further added, and the mixture was vigorously stirred with a TK homomixer M type (supplied by Tokushukikakogyo K.K.) at 10,000 rpm at room temperature for 10 minutes. The solvents were removed from the resultant emulsion by steam stripping, and the remaining mixture was concentrated with an evaporator to give a water-based dispersion having a solid content of about 30%. Further, the water-based dispersion was centrifugally separated at 3,000 rpm at room temperature for 15 minutes to remove an excess of the emulsifier and concentrate the dispersion, whereby an alkylated chlorosulfonated polyethylene latex having a solid content of 40% was obtained. A treating liquid of the following formulation including this latex was prepared.

| | |
|---|---|
| Aqueous solution of water-soluble resorcinol-formaldehyde condensate (solid content 8 wt. %) | 30 parts by weight |
| Vinylpyridine-styrene-butadiene terpolymer latex (solid content 40 wt. %, JSR0650) | 45 parts by weight |
| Alkylated chlorosulfonated polyethylene latex (solid content 40 wt. %) | 20 parts by weight |
| 25% Aqueous ammonia | 1 part by weight |
| Water | 4 part by weight |

The above treating liquid was applied to glass fiber strands (filament diameter 9 μm, 100 Tex, E-glass) in such an amount that the adhering solid content was 19%, and heat-treated at 270° C. for 1 minute. Then, the strands were preliminarily Z-twisted (or S-twisted) 2.1 turns per inch. Eleven bundles of the so-prepared preliminarily twisted glass fiber bundles were put together and S-twisted (or Z-twisted) 2.1 turns per inch to give a glass fiber cord [ECG150 3/11 2.1S(Z)].

The above-obtained glass fiber cord was aged at 100° C. for a predetermined period of time from 0 hour to 336 hours, and evaluated for a number of flexing before it was cut apart with an MIT method flexing tester under a load of 1 kg in an environment at room temperature or −15° C. Table 1 shows the results.

EXAMPLE 2

A glass fiber cord was obtained in the same manner as in Example 1 except that the glass fiber strands were replaced with high-strength glass fiber strands (filament diameter 7 μm, 67.5 Tex) having the composition shown in Table 2.

The so-obtained glass fiber cord was treated and tested in the same manner as in Example 1. Table 1 shows the results.

EXAMPLES 3 and 4

Glass fiber cords were obtained in the same manner as in Example 1 except that the treating liquid was replaced with the treating liquid of the following formulation.

The so-obtained glass fiber cords were treated and tested in the same manner as in Example 1. Table 1 shows the results.

Example 3:
| | |
|---|---|
| Aqueous solution of water-soluble resorcinol-formaldehyde condensate (solid content 8 wt. %) | 35 parts by weight |
| Butadiene-styrene-vinylpyridine terpolymer latex (solid content 40 wt. %, JSR0650) | 30 parts by weight |
| Alkylated chlorosulfonated polyethylene latex (solid content 40 wt. %) | 30 parts by weight |
| 25% Aqueous ammonia | 1 part by weight |
| Water | 4 part by weight |

Example 4:

| | |
|---|---|
| Aqueous solution of water-soluble resorcinol-formaldehyde condensate (solid content 8 wt. %) | 40 parts by weight |
| Butadiene-styrene copolymer latex (solid content 40 wt. %, Nipol LX112) | 43 parts by weight |
| Alkylated chlorosulfonated polyethylene latex (solid content 40 wt. %) | 12 parts by weight |
| 25% Aqueous ammonia | 1 part by weight |
| Water | 4 part by weight |

COMPARATIVE EXAMPLE 1

A glass fiber cord was obtained in the same manner as in Example 1 except that the alkylated chlorosulfonated polyethylene latex was replaced with a chlorosulfonated polyethylene latex (Esprene L-450, solid content 40 wt. %, supplied by Sumitomo Seika Chemical Co. Ltd.).

The so-obtained glass fiber cord was treated and tested in the same manner as in Example 1. Table 1 shows the results.

COMPARATIVE EXAMPLE 2

A glass fiber cord was obtained in the same manner as in Example 2 except that the alkylated chlorosulfonated polyethylene latex was replaced with a chlorosulfonated polyethylene latex (Esprene L-450, solid content 40 wt. %, supplied by Sumitomo Seika Chemical Co., Ltd.).

The so-obtained glass fiber cord was treated and tested in the same manner as in Example 1. Table 1 shows the results.

COMPARATIVE EXAMPLES 3 and 4

Glass fiber cords were obtained in the same manner as in Examples 3 and 4 except that the alkylated chlorosulfonated polyethylene latex was replaced with a chlorosulfonated polyethylene latex (Esprene L-450, solid content 40 wt. %, supplied by Sumitomo Seika Chemical Co., Ltd.).

The so-obtained glass fiber cords were treated and tested in the same manner as in Example 1. Table 1 shows the results.

TABLE 1

| | Time for aging (hr) | 0 | 24 | 72 | 120 | 168 | 336 |
|---|---|---|---|---|---|---|---|
| Ex. 1 | Room temperature | 23158 | 22731 | 20483 | 18623 | 14296 | 10658 |
| | −15° C. | 18387 | 17596 | 15252 | 12729 | 9418 | 6367 |
| Ex. 2 | Room temperature | 25444 | 25214 | 23031 | 20385 | 15926 | 12124 |
| | −15° C. | 21126 | 19556 | 17277 | 14802 | 10360 | 7504 |
| Ex. 3 | Room temperature | 23053 | 22964 | 22183 | 19967 | 14865 | 11058 |
| | −15° C. | 18167 | 17214 | 14958 | 12414 | 8258 | 5735 |
| Ex. 4 | Room temperature | 22396 | 21677 | 21109 | 19265 | 14351 | 10732 |
| | −15° C. | 17524 | 16691 | 14525 | 11893 | 7826 | 5418 |
| Comp. Ex. 1 | Room temperature | 22668 | 21934 | 19528 | 16885 | 13472 | 9832 |
| | −15° C. | 15119 | 14452 | 11981 | 8363 | 4273 | 2095 |
| Comp. Ex. 2 | Room temperature | 24335 | 24117 | 21681 | 18574 | 14329 | 10335 |
| | −15° C. | 16931 | 16097 | 12879 | 9699 | 4846 | 2505 |
| Comp. Ex. 3 | Room temperature | 23113 | 21823 | 21007 | 17465 | 14084 | 10298 |
| | −15° C. | 14793 | 14067 | 10966 | 9228 | 3762 | 1729 |
| Comp. Ex. 4 | Room temperature | 22412 | 21483 | 20622 | 18778 | 14214 | 10473 |
| | −15° C. | 14928 | 14215 | 10763 | 9007 | 3571 | 1594 |

TABLE 2

| Components | Contents |
| --- | --- |
| $SiO_2$ | 64.4 |
| $Al_2O_3$ | 25.0 |
| CaO | 0.3 |
| MgO | 10.0 |
| $B_2O_3$ | 0.1 |
| $Na_2 + K_2O$ | 0.2 |

Table 1 shows that the results of Examples 1 and 2 are excellent over those of Comparative Examples 1 and 2 in cold resistance and fatigue resistance under a flexing force at an earlier stage, particularly in heat resistance, cold resistance and fatigue resistance under a flexing force.

EXAMPLES 5-8

A halogen-containing polymer type adhesive solution (Chemlok TS2394-53, solid content 25 wt. %, supplied by Road Corporation) was coated on the glass fiber cords obtained in Examples 1 to 3 in such an amount that the adhering solid content was 35% by weight based on each glass fiber cord, and then dried.

Then, threaded belts having a width of 19 mm and a length of 980 mm were obtained from the above cords as reinforcing materials and a rubber having the composition shown in Table 3.

TABLE 3

| Rubber compound | |
| --- | --- |
| | (Part by weight) |
| Zetpol 2020 *1 | 100 |
| Zinc oxide (#1) | 5 |
| Stearic acid | 1 |
| SRF carbon black | 50 |
| Sulfur | 0.5 |
| Tetramethylthiuram disulfide | 1.5 |
| Mercaptobenzotiazole | 0.5 |

Note *1: A product of Nippon Zeon Co., Ltd. (hydrogenated NBR, iodine number 28, bound acrylonitrile 36%)

Each of the above threaded belts (timing belts) was set at a running tester equipped with a 6,000 rpm drive motor, whose layout is shown in FIG. and subjected to an on/off running test in which one cycle consisting of running for 1 minute and halting for 5 minutes was repeated 500 times. That is, in FIG. numeral 1 indicates a threaded belt to be tested, numeral 2 indicates a drive pulley to be driven to rotate at 6,000 rpm by a drive motor (not shown), numeral 3 indicates a follower pulley, numeral 4 indicates an idler, and numeral 5 indicates a tension weight to be imposed on a shaft of the follower pulley 3 for giving tension to the threaded belt 1. Each threaded belt was tested by the above on-off test in an environment at $-15°$ C. After the test, the threaded belts were measured for tensile strength to determine a ratio of the tensile strength of the tested threaded belt to that of the threaded belt before the test, i.e., a tensile strength retention ratio. Table 4 shows the results.

COMPARATIVE EXAMPLES 5-8

Threaded belts were obtained in the same manner as in Examples 5 to 8 except that the glass fiber cords were replaced with the glass fiber cords obtained in Comparative Examples 4 to 6.

The threaded belts were subjected to the on-off test in the same manner as in Examples 5 to 8. Table 4 shows the results.

TABLE 4

| | Example | | | | Comparative Example | | | |
| --- | --- | --- | --- | --- | --- | --- | --- | --- |
| | 5 | 6 | 7 | 8 | 5 | 6 | 7 | 8 |
| Tensile strength retention ratio (%) | 82 | 91 | 75 | 76 | 67 | 74 | 59 | 63 |

What is claimed is:

1. A water-based treating liquid for rubber-reinforcing a glass fiber cord, said liquid which contains a solid composition consisting essentially of:
   (a) a rubber latex
   (b) an alkylated chlorosulfonated polyethylene latex, and
   (c) a water-soluable resorcinol-formaldehyde condensate,
   wherein the amount of said component (2) is 10 to 70% by weight, based on the total weight of components (1) and (2), and the amount of said component (3) is 5 to 20% by weight, based on the total weight of said components (1) and (2).

2. The water-based treating liquid of claim 1, wherein said liquid contains an amount of 15 to 30% by weight of said solid composition.

3. The water-based treating liquid of claim 1, wherein, based on the total weight of said components (1) and (2), the amount of said component (2) is 20 to 50% by weight and the amount of said component (3) is 7 to 15% by weight.

4. The water-based treating liquid of claim 2, wherein, based on the total weight of said components (1) and (2), the amount of said component (2) is 20 to 50% by weight and the amount of said component (3) is 7 to 15% by weight.

5. The water-based treating liquid of claim 1, wherein said component (1) is selected from the group consisting of vinylpyridine-styrene-butadiene terpolymer latex, styrene-butadiene copolymer latex, and a mixture of vinylpyridine-styrene-butadiene terpolymer latex and styrene-butadiene copolymer latex.

6. The water-based treating liquid of claim 2, wherein said component (1) is selected from the group consisting of vinylpyridine-styrene-butadiene terpolymer latex, styrene-butadiene copolymer latex, and a mixture of vinylpyridine-styrene-butadiene terpolymer latex and styrene-butadiene copolymer latex.

7. The water-based treating liquid of claim 3, wherein said component (1) is selected from the group consisting of vinylpyridine-styrene-butadiene terpolymer latex, styrene-butadiene copolymer latex, and a mixture of vinylpyridine-styrene-butadiene terpolymer latex and styrene-butadiene copolymer latex.

8. The water-based treating liquid of claim 3, wherein said component (1) is selected from the group consisting of vinylpyridine-styrene-butadiene terpolymer latex, styrene-butadiene copolymer latex, and a mixture of vinylpyridine-styrene-butadiene terpolymer latex and styrene-butadiene copolymer latex.

9. A rubber-reinforced glass fiber cord containing, as a coating, a composition consisting essentially of:
   (a) a rubber latex
   (b) an alkylated chlorosulfonated polyethylene latex, and
   (c) a water-soluable resorcinol-formaldehyde condensate,
   wherein the amount of said component (2) is 10 to 70% by weight, based on the total weight of said components (1) and (2), and the amount of said component (3) is 5 to 20% by weight, based on the total amount of said components (1) and (2).

10. The glass fiber cord of claim 9, wherein said coating composition is present in an amount of 10 to 30% by weight based on the glass fiber of said glass fiber cord.

11. The glass fiber cord of claim 9, wherein, based on the total weight of said components (1) and (2), the amount of said components (2) is 20 to 50% by weight and the amount of said components (3) is 7 to 15% by weight.

12. The glass fiber cord of claim 10, wherein, based on the total weight of said components (1) and (2), the amount of said components (2) is 20 to 50% by weight and the amount of said components (3) is 7 to 15% by weight.

13. The glass fiber cord of claim 9, wherein said component (1) is selected from the group consisting of vinylpyridine-styrene-butadiene terpolymer latex, styrene-butadiene copolymer latex, and a mixture of vinylpyridine-styrene-butadiene terpolymer latex and styrene-butadiene copolymer latex.

14. The glass fiber cord of claim 10, wherein said component (1) is selected from the group consisting of vinylpyridine-styrene-butadiene terpolymer latex, styrene-butadiene copolymer latex, and a mixture of vinylpyridine-styrene-butadiene terpolymer latex and styrene-butadiene copolymer latex.

15. The glass fiber cord of claim 11, wherein said component (1) is selected from the group consisting of vinylpyridine-styrene-butadiene terpolymer latex, styrene-butadiene copolymer latex, and a mixture of vinylpyridine-styrene-butadiene terpolymer latex and styrene-butadiene copolymer latex.

16. The glass fiber cord of claim 12, wherein said component (1) is selected from the group consisting of vinylpyridine-styrene-butadiene terpolymer latex, styrene-butadiene copolymer latex, and a mixture of vinylpyridine-styrene-butadiene terpolymer latex and styrene-butadiene copolymer latex.

17. A rubber product reinforced with said glass fiber cord as set forth in claim 9.

18. The rubber product of claim 17, wherein said glass fiber cord is contained in an amount of 10 to 70% by weight based on the weight of said rubber product.

* * * * *